(12) United States Patent
Cain et al.

(10) Patent No.: US 7,921,102 B2
(45) Date of Patent: Apr. 5, 2011

(54) MAINTAINED SYMBOL TABLE ONLY INDEX

(75) Inventors: Michael W. Cain, Rochester, MN (US); Michael S. Faunce, Rochester, MN (US); Wei Hu, Rochester, MN (US); Shantan Kethireddy, Rolling Meadows, IL (US); Andrew Peter Passe, Rochester, MN (US); Ulrich Thiemann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/839,803

(22) Filed: Jul. 20, 2010

(65) Prior Publication Data

US 2010/0287206 A1 Nov. 11, 2010

Related U.S. Application Data

(62) Division of application No. 12/014,562, filed on Jan. 15, 2008, now Pat. No. 7,792,823.

(51) Int. Cl.
*G06F 17/30* (2006.01)

(52) U.S. Cl. ......................................... 707/715; 707/796

(58) Field of Classification Search ........................ None
See application file for complete search history.

(56) References Cited

U.S. PATENT DOCUMENTS

| | | | |
|---|---|---|---|
| 5,129,082 A * | 7/1992 | Tirfing et al. ........................... | 1/1 |
| 5,603,032 A | 2/1997 | Attal | |
| 5,875,334 A | 2/1999 | Chow et al. | |
| 6,285,994 B1 * | 9/2001 | Bui et al. ....................... | 707/745 |
| 6,356,888 B1 | 3/2002 | Egan et al. | |
| 6,405,187 B1 | 6/2002 | Egan et al. | |
| 6,446,084 B1 * | 9/2002 | Shaylor et al. .......................... | 1/1 |
| 7,020,647 B1 | 3/2006 | Egan et al. | |
| 7,117,222 B2 | 10/2006 | Santosuosso | |
| 2003/0088715 A1 | 5/2003 | Chaudhuri et al. | |
| 2003/0115183 A1 | 6/2003 | Abdo et al. | |
| 2003/0212694 A1 | 11/2003 | Potapov et al. | |
| 2008/0127154 A1 | 5/2008 | Drepper | |
| 2009/0106281 A1 | 4/2009 | Marwah et al. | |

OTHER PUBLICATIONS

"Data Compression in Oracle," by Poess and Potapov. IN: Proceedings of the 29th International Conference on Very Large Data Bases, vol. 29, pp. 937-947 (2003). Available at: ACM.

"DBXplorer: A system for Keyword-based Search over Relatinal Databases," by Agrawal et al. IN: Proceedings of the 18th Int'l Conf on Data Engineering (2002). Available at IEEE Xplore.

* cited by examiner

*Primary Examiner* — Neveen Abel-Jalil
*Assistant Examiner* — Daniel Kinsaul
(74) *Attorney, Agent, or Firm* — Wood, Herron & Evans, LLP

(57) ABSTRACT

A method, apparatus and program product is provided for optimizing a database query. A query syntax, system generated predicates, and requisite statistics of the database query are analyzed to determine if a predicate structure is a good candidate for a symbol table only data structure. The predicate structure is analyzed to determine if the predicate structure is already encompassed by an encoded vector index. The symbol table only data structure is generated for at least one column in a database table without generating a corresponding vector data structure from an encoded vector index if the predicate structure is a good candidate and not encompassed by an encoded vector index. The symbol table only data structure is maintained by detecting a change in data associated with the symbol table only data structure and updating the symbol table only data structure to reflect the change in the data.

18 Claims, 4 Drawing Sheets

SYMBOL TABLE

| KEY VALUE | CODE | FIRST ROW | LAST ROW | COUNT |
|---|---|---|---|---|
| ARIZONA | 1 | 1 | 80005 | 5000 |
| ARKANSAS | 2 | 5 | 99760 | 7300 |
| ... | | | | |
| VIRGINIA | 37 | 1222 | 30111 | 340 |
| WYOMING | 38 | 7 | 83000 | 2760 |

SYMBOL TABLE

| KEY VALUE | CODE | FIRST ROW | LAST ROW | COUNT |
|---|---|---|---|---|
| ARIZONA | 1 | 1 | 80005 | 5000 |
| ARKANSAS | 2 | 5 | 99760 | 7300 |
| . . . | | | | |
| VIRGINIA | 37 | 1222 | 30111 | 340 |
| WYOMING | 38 | 7 | 83000 | 2760 |

FIG. 2

MAINTAINED SYMBOL TABLE ONLY INDEX

CROSS-REFERENCE TO RELATED APPLICATIONS

This application is a divisional of U.S. patent application Ser. No. 12/014,562, filed on Jan. 15, 2008 by Michael W. Cain et al., which is entitled MAINTAINED SYMBOL TABLE ONLY INDEX, the entire disclosure of which is incorporated by reference herein.

FIELD OF THE INVENTION

The present invention relates to computers and data processing, and more particularly to a method for optimizing database queries.

BACKGROUND OF THE INVENTION

Query optimization is a function of many relational database management systems in which multiple query plans for satisfying a particular database query are examined to determine the most efficient way to execute the query. This may or may not result in the absolute best strategy for the query because there are many ways to create plans, and some plans require more time and resources than are available to execute the query. There is a trade off between the amount of time spent figuring out the best plan and the amount of time executing the plan. Different qualities of database management systems have different methods of balancing the trade off. For example, cost based query optimizers may evaluate the resource footprint of various query plans and use this as the basis for plan selection. Generally the resources which are costed include CPU path length, amount of disk buffer space, disk storage service time, and interconnect usage between units of parallelism. The set of query plans examined may be formed by examining possible access paths (e.g., primary index access, secondary index access, full file scan) and various relational table join techniques (e.g, merge join, hash join, product join). The search space comprising the query plans may become quite large depending on the complexity of the database query.

To assist with complex and nested queries, query optimizers may create temporary objects or index objects as part of the optimization process. These temporary objects may be optimized subsets of the overall optimization including partially optimized tables, or specially created indexes. For example, the query optimizer may analyze a row selection in a query and use that analysis to determine if creation of a separate object containing an index may be beneficial. These objects are generally temporary in nature, meaning that they may persist until the system is restarted, until the underlying data has changed, or until the object is no longer needed. Index objects are more often of a permanent nature (across system restarts). Both temporary objects and temporary index objects are generally stored in query plan caches which allow for the use and reuse of the temporary objects in an effort to save time and processing for subsequent queries.

One such index object is an encoded vector index ("EVI"). An EVI is a data structure that is made up of two primary components: a symbol table and a vector. The symbol table contains the distinct key values in the rows covered, as well as statistical information about each key. The statistical information typically includes a numeric 'gray' code identifying the key, the first and last rows where the key is found, and the number of times the key appears in the table. The vector corresponds to the actual rows in the table and contains a list of byte codes indicating which key each row contains. EVIs are a complementary alternative to existing index objects, such as binary radix tree structure-logical file or SQL index, and are a variation on bitmap indexing. EVIs are usually recommended for larger tables with a low number of distinct values for the index key. Because of their compact size and relative simplicity, EVIs provide for faster scans of a table that may also be processed in parallel. The database engine uses the vector portion of the EVI to build a dynamic bitmap that contains one bit for each row in the table. If the row satisfies a query selection, the bit is set on. If the row does not satisfy the query selection, the bit is set off. Similar to a bitmap index, intermediate dynamic bitmaps can be AND'ed and OR'ed together to satisfy an ad hoc query.

Even independent from the vector, however, an EVI symbol table may be extremely useful for understanding cardinality, data clustering, data skew, and frequency of values. Use of EVIs for commonly used local selection and foreign key columns of larger tables, where the column cardinality (number of distinct values) is relatively small compared to the table's overall record count may be very beneficial and may be requested by some users. However, this requires user intervention to create EVIs and also comes with the additional cost associated with creation of the vector. The creation and maintenance of this vector structure may be rather difficult and time-consuming compared to the relatively simply maintenance of the symbol table portion of the EVI, especially in rapidly changing environments. However, in many cases, the EVI symbol table alone can provide a great deal of information that can be used for statistics as well as execution of certain queries.

What is needed therefore is an index that can be used in a database query containing the statistical and cardinality content of the EVI, but that does not require the time and resources to generate and maintain the vector.

SUMMARY OF THE INVENTION

Embodiments of the invention provide a method, apparatus and program product that utilize a symbol table only (STO) data structure, which incorporates similar information to an EVI symbol table but omits an EVI vector, in connection with the optimization an execution of database queries.

Some embodiments amortize a cost associated with the generation of the symbol table only data structure over multiple queries while other embodiments amortize the cost associated with the generation of the symbol table only data structure based on symbol table only statistics. The symbol table only statistics may include statistics such as cardinality, data skew, selectivity, and clusteredness. In some embodiments, analyzing the predicate structure includes analyzing a plurality of columns associated with the query to determine how the plurality of columns are grouped, distincted, aggregated, and combinations thereof. Determining if a predicate structure is a good candidate for a symbol table only data structure, for some embodiments, includes analyzing a grouping, ordering, and distincting of the database query and system generated lookahead predicates. Generation of the symbol table only data structure may be triggered when needed by a query optimizer, may be manually triggered by a user, or may be triggered at startup of, for example, the entire computer system, or just of the database engine.

Other embodiments of the invention provide a method, apparatus and program product for maintaining a symbol table only data structure by detecting a change in data associated with the symbol table only data structure and updating the symbol table only data structure to reflect the change in the data. In some embodiments, detecting a change includes detecting data being eliminated from an underlying database table associated with the symbol table only data structure, or detecting data being added to an underlying database table associated with the symbol table only data structure. If a new encoded vector index is created in response to detecting the change in data that is equivalent to or encompasses the symbol table only data structure, then the symbol table only data structure may be removed. In some embodiments, the symbol table only data structure is updated in conjunction with the data changes to an underlying database table. In other embodiments, updates to the symbol table only data structure are deferred.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

FIG. 2 is an exemplary representation of a symbol table used for query optimization.

DETAILED DESCRIPTION

Figure 1:
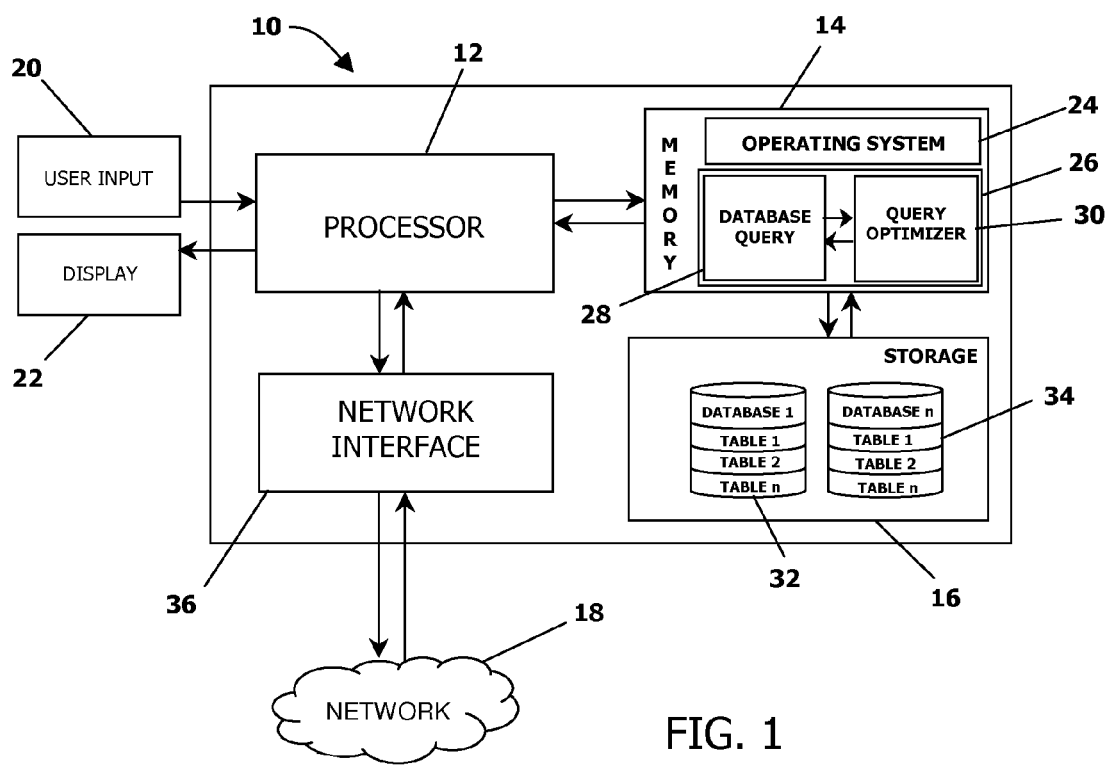
FIG. 1 is a block diagram of an exemplary hardware and software environment for a computer suitable for implementing query optimization using symbol table only data structures consistent with embodiments of the invention.

Turning to the drawings, wherein like numbers denote like parts throughout the several views, FIG. 1 illustrates an exemplary hardware and software environment for an apparatus 10 suitable for query optimization consistent with the invention. For the purposes of the invention, apparatus 10 may represent practically any computer, computer system, or programmable device e.g., multi-user or single-user computers, desktop computers, portable computers and devices, handheld devices, network devices, mobile phones, etc. Apparatus 10 will hereinafter be referred to as a "computer" although it should be appreciated that the term "apparatus" may also include other suitable programmable electronic devices.

Computer 10 typically includes at least one processor 12 coupled to a memory 14. Processor 12 may represent one or more processors (e.g. microprocessors), and memory 14 may represent the random access memory (RAM) devices comprising the main storage of computer 10, as well as any supplemental levels of memory, e.g., cache memories, non-volatile or backup memories (e.g. programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or another computer coupled to computer 10 via a network 18.

Computer 10 also typically receives a number of inputs and outputs for communicating information externally. For interface with a user or operator, computer 10 typically includes one or more user input devices 20 (e.g., a keyboard, a mouse, a trackball, a joystick, a touchpad, a keypad, a stylus, and/or a microphone, among others). Computer 10 may also include a display 22 (e.g., a CRT monitor, an LCD display panel, and/or a speaker, among others). The interface to computer 10 may also be through an external terminal connected directly or remotely to computer 10, or through another computer communicating with computer 10 via a network 18, modem, or other type of communications device.

Computer 10 operates under the control of an operating system 24, and executes or otherwise relies upon various computer software applications, components, programs, objects, modules, data structures, etc. (e.g. database application 26). Application 26, for example, may further include database queries 28 being optimized by a query optimizer 30 querying the databases 32, 34. Computer 10 communicates on the network 18 through a network interface 36.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 1 is not intended to limit the present invention. Indeed, those skilled in the art will recognize that other alternative hardware and/or software environments may be used without departing from the scope of the invention.

There are numerous strategies and methodologies used to optimize database queries. The optimizer considers the possible query plans for a given input query, and attempts to determine which of those plans will be the most efficient. Cost-based query optimizers assign an estimated "cost" to each possible query plan, and choose the plan with the smallest cost. Costs are used to estimate the runtime cost of evaluating the query, in terms of the number of I/O operations required, the CPU requirements, and other factors. The set of query plans examined is formed by examining the possible access paths (e.g. index scan, sequential scan) and join algorithms (e.g. sort-merge join, hash join, nested loops). The search space can become quite large depending on the complexity of the SQL query. To assist with the process, the optimizer may create temporary objects or indexes which can be used to optimize a current query and be temporarily stored and reused saving time and resource for subsequent queries. One such object is an encoded vector index ("EVI"). An EVI is a special type of index containing two parts, a symbol table index and a vector, much like a bitmap, indicating where the values of the symbol table are using byte codes. The vector portion can be used for selection of particular rows or to find specific occurences of values. EVIs tend to be large and therefore may be expensive from a time and resource perspective to generate and maintain.

A representation of a symbol table portion of an EVI is illustrated in FIG. 2. The symbol table only ("STO") data structure 50 is an index that is relatively lightweight and if created as a stand alone index, may allow a query optimizer to create and maintain EVI symbol tables more often than a full EVI based on a much lower creation cost/amortization value. The frequency and priority at which these symbol table only data structures 50 are created/maintained may also be managed by the user. The optimizer may then cost these indexes along with other objects and strategies to determine if they are worthwhile and if the create cost/maintenance cost is below a specified threshold. The optimizer may also use the query plan cache to amortize frequently advised EVIs and/or symbol table only data structures 50. The more times a symbol table only data structure 50 is advised by the query optimizer, the more its create cost would get discounted (amortization value).

The symbol table only data structure 50, in some embodiments and as depicted in FIG. 2, may contain information such as key values 52, codes associated with the key values 54, the first row where the key value occurs 56, the last row where the key value occurs 58, and the number of occurrences of the key value in the table 60, among other values. Using the symbol table only data structures 50 may be advantageous to the query optimizer as the symbol table only data structure 50 may be used to quickly execute certain aggregation, distinct, and groupby queries without needing to access the table, e.g. index only access.

Figure 3:
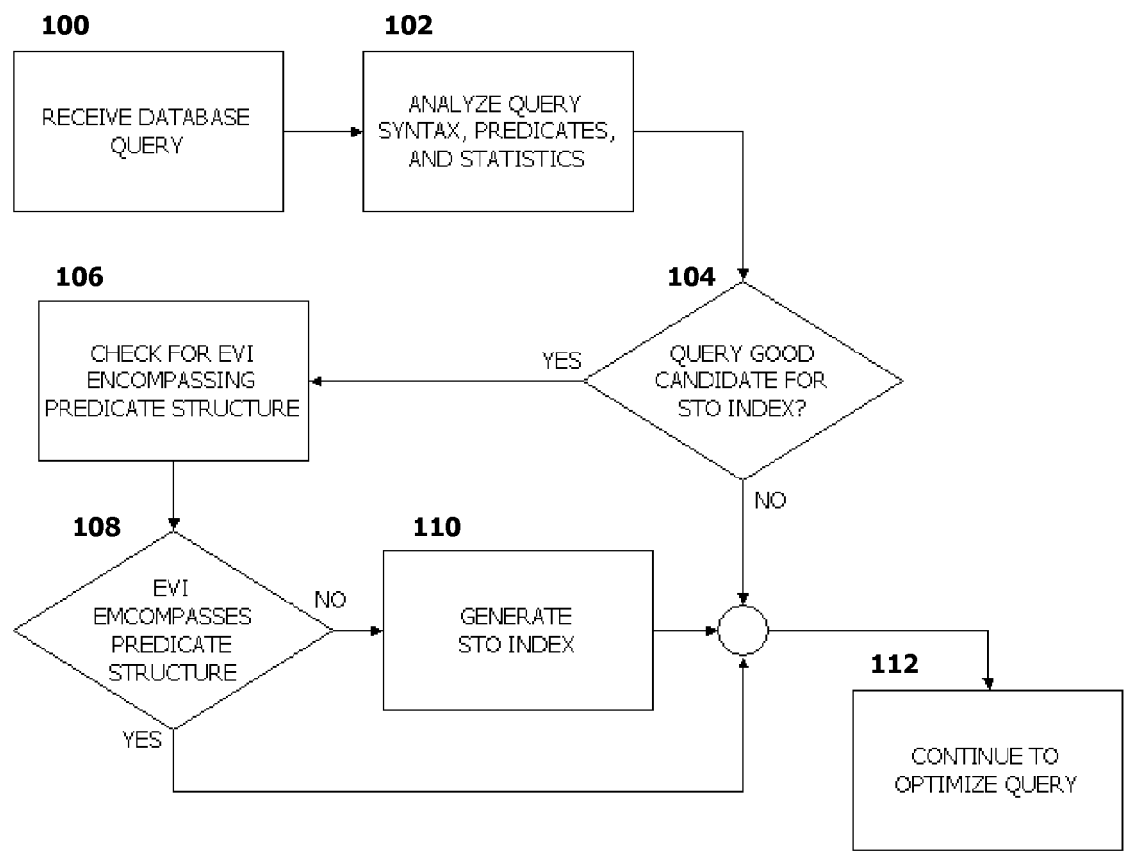
FIG. 3 is a flowchart of an exemplary process for generating a symbol table only data structure consistent with embodiments of the invention.

A process for creating a STO index is shown in the flowchart in FIG. 3. A database query is received in block 100. As discussed above, the query syntax, predicates, statistics, and other attributes, are analyzed in block 102. If this query is not a good candidate for the symbol table only data structure ("no" branch of decision block 104), then the optimization of the query continues in block 112. If the query is a good candidate for the symbol table only data structure ("yes" branch of decision block 104), then a check is made in block 106 to search for an EVI data structure that would encompass the new symbol table only data structure. Generally good candidates for the STO index include columns referenced in equal predicates, like local predicates, which are good candidates due to their very specific, exact nature (i.e. "equal", T1.C1='A').

If an EVI exists that encompasses the predicate structure of the query ("yes" branch of decision block 108), then the optimization of the query continues in block 112 as the information for the new symbol table only data structure would already exist in the EVI. If there isn't an EVI that encompasses the predicate structure of the query ("no" branch of decision block 108), then a symbol table only data structure is generated in block 110. After the creation of the symbol table only data structure, the optimization of the query continues in block 112.

During optimization, the query optimizer evaluates the predicate structure of a query as well as the way the columns are grouped, distincted, and aggregated. The predicates may be analyzed by the query optimizer to identify if the predicates are already encompassed by an existing EVI, and if not to determine if the predicate structure is a good candidate for a symbol table only data structure. Based on this information and the distribution of data in the table, e.g., cardinality vs. active entries, the query optimizer may advise the creation of a symbol table only data structure. As the creation of this particular symbol table only data structure, or a more encompassing symbol table only data structure, gets advised over and over by the query optimizer, its create cost value will get amortized, effectively lowering the overall creation cost as the optimizer discounts the create cost using the amortization value.

For example, the STO index may directly benefit queries involving SQL statements such as:

```
SELECT Region, count(*)
FROM Sales
GROUP BY Region
OPTIMIZE FOR ALL ROWS
```

With an STO Index, the database engine need only scan the symbol table for the already distinct Region column values and the associated occurrence count to build the result set for this SELECT statement. This kind of "index only" access completely avoids having to touch the actual database table (assuming concurrent updates of the STO Index when the database table is modified) and is both CPU and I/O friendly, because the STO Index is very compact and has a much smaller footprint than the database table.

Even if the STO Index is not maintained concurrently, it still provides very valuable statistical information in a readily accessible manner, when finding alternative access methods for this set of SQL statements. For example the query optimizer can make very accurate guesses on how large a hash table has to be sized, if such an access method is chosen to implement the GROUPing.

Another example of SQL statements that may benefit from an STO Index include statements such as:

```
SELECT DISTINCT Region
FROM Sales
OPTIMIZE FOR ALL ROWS
```

Very similar to above, an index only access is possible, or at the very least statistical cardinality questions may be answered efficiently.

A further example of SQL statements that may benefit from an STO Index include statements such as:

```
SELECT COUNT (DISTINCT Region)
FROM Sales
```

This query also allows index only access by just looking at the number of symbol table key values.

Additionally, a query optimizer may have an internal question, as typically posed by the optimizer prior to its statistical sub components when gathering costing information for certain access methods, e.g. based on such statistics such as cardinality. For example, "C1.getCardinality (where C2=5)" is a typical question posed for the number of distinct values of column C1, restricted by the qualifying predicate C2=5 (to consider only those different values of C2=5 in the same table row). If an STO Index over columns C2 and C1 exists, having a 2-column key C2:C1 with leading key C2 and trailing key C1, the structure may be scanned starting at C2=5 until reaching C2=6, counting the number of rows of the STO Index in between those points to obtain an accurate answer for this cardinality question. This assumes that the STO key values are kept in, for example, ascending order, which is typical for an index structure of any kind.

Because of the relatively lightweight structure of the symbol table only data structure, if created, this data structure may be maintained at a priority governed by the user, but also may be removed if an EVI is created that is equivalent to or encompasses the symbol table only data structure. Contemporary EVI technology only describes the 'last row' and 'first row' position of a key in one direction. If the last row key or first row key is eliminated or changed, the corresponding last/first row entry for that key value in the symbol table portion of the EVI is not updated, due in part to the extensive cost to generate and maintain EVI objects. Embodiments of the invention, however, may take advantage of the lightweight structure of the symbol table only data structure and may be extended to support both forward and backward maintenance of the last row/first row or occurrence count column for symbol table only data structures either immediately or delayed. Those are cases where the numeric gray code of a key value, as shown in FIG. 2 would likely be used for an STO Index. Without such first/last row maintenance the gray code would usually not be required for an STO Index.

Figure 4:
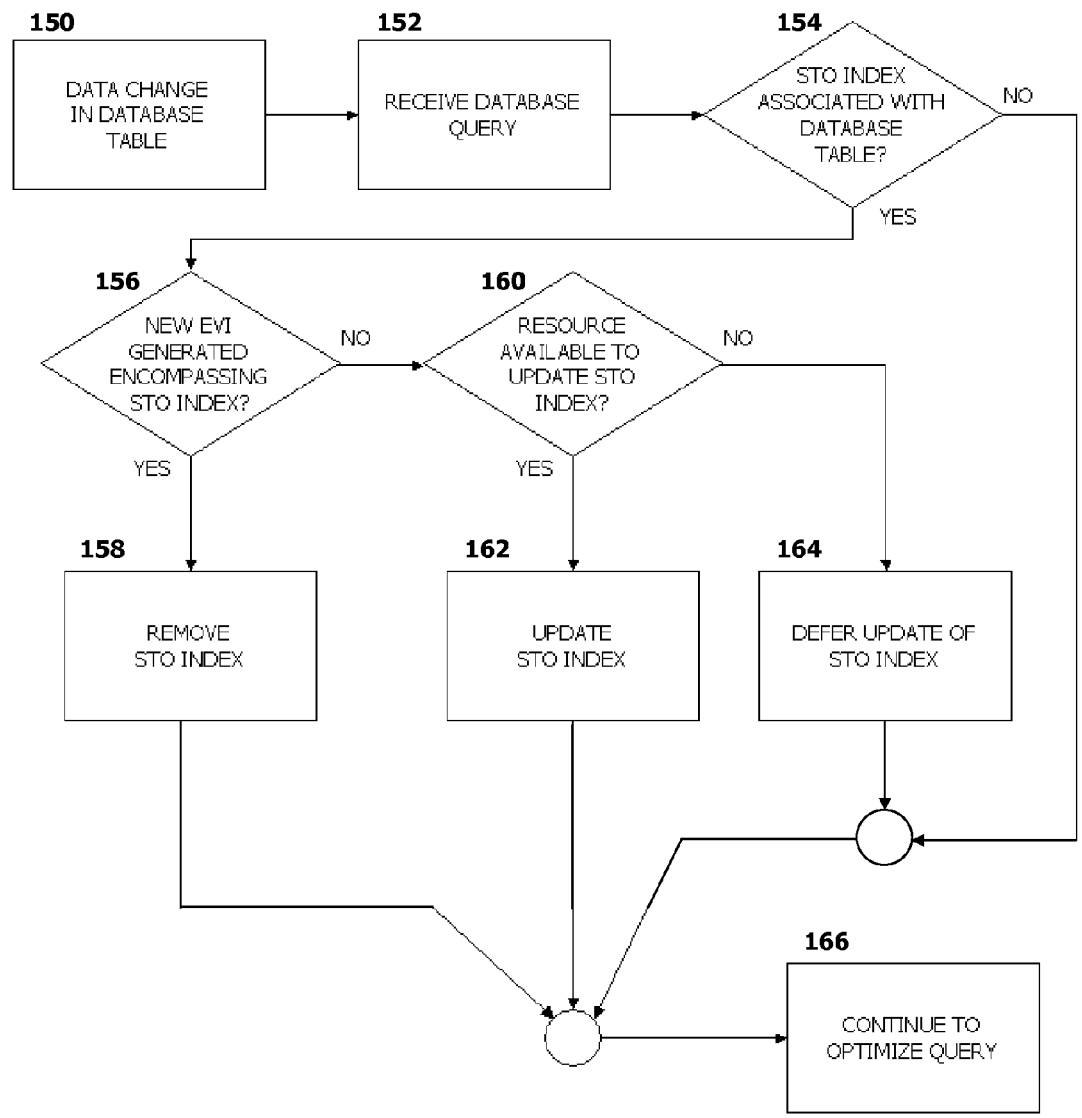
FIG. 4 is a flowchart of an exemplary process for maintaining a symbol table only data structure consistent with embodiments of the invention.

In some embodiments, the STO Index may be maintained by the process shown in the flowchart in FIG. 4. A change to the underlying data in a database table occurs in block 150. This change may include instances of adding or deleting rows or adding or deleting columns in the table. The modification of the database table can be detected and handled in different ways. For example, the modification may be handled as immediate maintenance while the table is updated, via an "update trigger" that the STO Index maintenance code registered with the table object, or via a more deferred way, e.g., when a database query that referenced the now changed table is received and optimized. The flowchart of FIG. 4 describes the latter. After the modification of the database table, a database query is received in block 152. During the optimization of the database query, an existing symbol table only data structure may be located in a query plan cache that is related to the query. A check is made to determine if the symbol table only data structure is associated with, and thereby affected by the change to, the database table changed in block 150. If the symbol table only data structure is not associated with the changed database table ("no" branch of decision block 154), then the optimization of the query continues in block 166. If the symbol table only data structure is associated with the changed database table ("yes" branch of decision block 154), then a check is made to determine if a new EVI that encompasses the symbol table only data structure has been generated, or is designated to be generated. If the query optimizer found such an EVI or advises the creation of a new EVI ("yes" branch of decision block 156), then the symbol table only data structure is no longer necessary as the updated data for the data structure will be stored in the symbol table portion of the EVI. The symbol table only data structure is removed from the plan cache in block 158 and the optimization of the query continues in block 166.

If a new EVI does not exist and is not designated to be generated by the query optimizer, then a check of the available resources is performed in decision block 160. If there is sufficient resource to update the symbol table only data structure ("yes" branch of decision block 160), then the symbol table only data structure is updated, or in some embodiments regenerated, in block 162. If there is not sufficient resource to update the symbol table only data structure ("no" branch of decision block 160), then the update of the symbol table only data structure is deferred in block 164. After either the update or the deferred update of the symbol table only data structure in blocks 162 or 164, the optimization of the query continues in block 166.

While all of the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the applicant's general inventive concept.

What is claimed is:

1. A method of maintaining a symbol table only data structure, the method comprising:
   detecting a change in data associated with the symbol table only data structure;
   wherein the symbol table only data structure is generated for at least one column in a database table without generating a corresponding vector data structure from an encoded vector index;
   wherein the detected change results from a change to a first row or a last row or an occurrence count of at least one key value in the symbol table only data structure;
   updating the symbol table only data structure to reflect the change to the first row or the last row or occurrence count of the key value; and
   updating the symbol only data structure in conjunction with a detected change to an underlying database table or with a database query that references the underlying database table.

2. The method of claim 1 wherein detecting a change comprises:
   detecting data being eliminated from an underlying database table associated with the symbol table only data structure.

3. The method of claim 1 wherein detecting a change comprises:
   detecting data being added to an underlying database table associated with the symbol table only data structure.

4. The method of claim 1 wherein detecting a change comprises:
   detecting the creation of a new encoded vector index that is equivalent to or encompasses the symbol table only data structure; and
   removing the symbol table only data structure.

5. The method of claim 1 wherein updating the symbol table only data structure comprises:
   updating the symbol table only data structure in conjunction with the detected change to the underlying database table.

6. The method of claim 1 wherein updating the symbol table only data structure comprises:
   deferring updates of the symbol table only data structure after changes to the data in the underlying database table.

7. An apparatus comprising:
   a processor; and
   program code configured to be executed by the processor to maintain a symbol table only data structure, the program code configured to detect a change in data associated with the symbol table only data structure, wherein the symbol table only data structure is generated for at least one column in a database table without generating a corresponding vector data structure from an encoded vector index, wherein the detected change results from a change to a first row or a last row or an occurrence count of at least one key value in the symbol table only data structure, and wherein the program code is further configured to update the symbol table only data structure to reflect the change to the first row or the last row or occurrence count of the key value and update the symbol only data structure in conjunction with a detected change to an underlying database table or with a database query that references the underlying database table.

8. The apparatus of claim 7 wherein the program code is configured to detect a change by:
   detecting data being eliminated from an underlying database table associated with the symbol table only data structure.

9. The apparatus of claim 7 wherein the program code is configured to detect a change by:
   detecting data being added to an underlying database table associated with the symbol table only data structure.

10. The apparatus of claim 7 wherein the program code is configured to detect a change by:
    detecting the creation of a new encoded vector index that is equivalent to or encompasses the symbol table only data structure; and
    removing the symbol table only data structure.

11. The apparatus of claim 7 wherein the program code is configured to update the symbol table only data structure by:
    updating the symbol table only data structure in conjunction with the detected change to the underlying database table.

12. The apparatus of claim 7 wherein the program code is configured to update the symbol table only data structure by:
    deferring updates of the symbol table only data structure after changes to the data in the underlying database table.

13. A program product, comprising:
    a recordable type computer readable medium; and
    program code configured to maintain a symbol table only data structure, the program code resident on the computer readable medium and configured to detect a change in data associated with the symbol table only data structure, wherein the symbol table only data structure is generated for at least one column in a database table without generating a corresponding vector data structure from an encoded vector index, wherein the detected change results from a change to a first row or a last row or an occurrence count of at least one key value in the symbol table only data structure, and wherein the program code is further configured to update the symbol table only data structure to reflect the change to the first row or the last row or occurrence count of the key value and update the symbol only data structure in conjunction with a detected change to an underlying database table or with a database query that references the underlying database table.

14. The program product of claim 13 wherein the program code is configured to detect a change by:
    detecting data being eliminated from an underlying database table associated with the symbol table only data structure.

15. The program product of claim 13 wherein the program code is configured to detect a change by:
    detecting data being added to an underlying database table associated with the symbol table only data structure.

16. The program product of claim 13 wherein the program code is configured to detect a change by:
    detecting the creation of a new encoded vector index that is equivalent to or encompasses the symbol table only data structure; and
    removing the symbol table only data structure.

17. The program product of claim 13 wherein the program code is configured to update the symbol table only data structure by:
    updating the symbol table only data structure in conjunction with the detected change to the underlying database table.

18. The program product of claim 13 wherein the program code is configured to update the symbol table only data structure by:
    deferring updates of the symbol table only data structure after changes to the data in the underlying database table.

* * * * *